Patented June 8, 1948

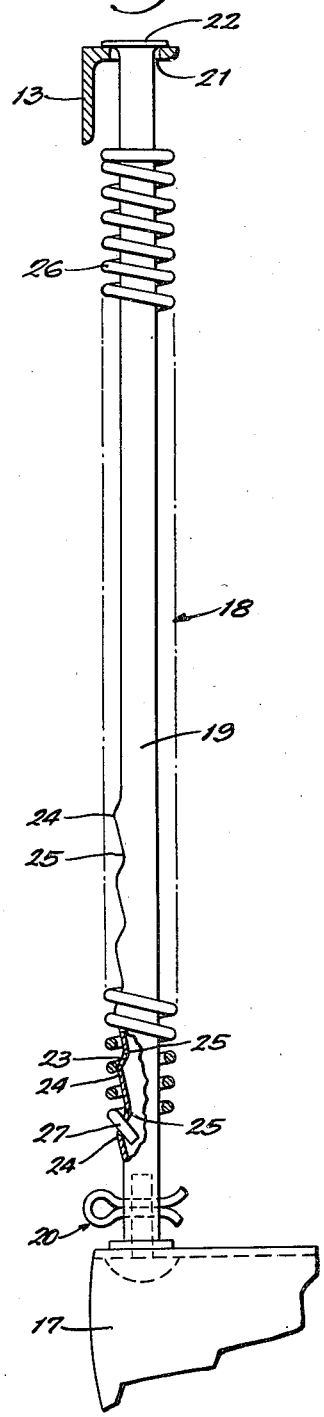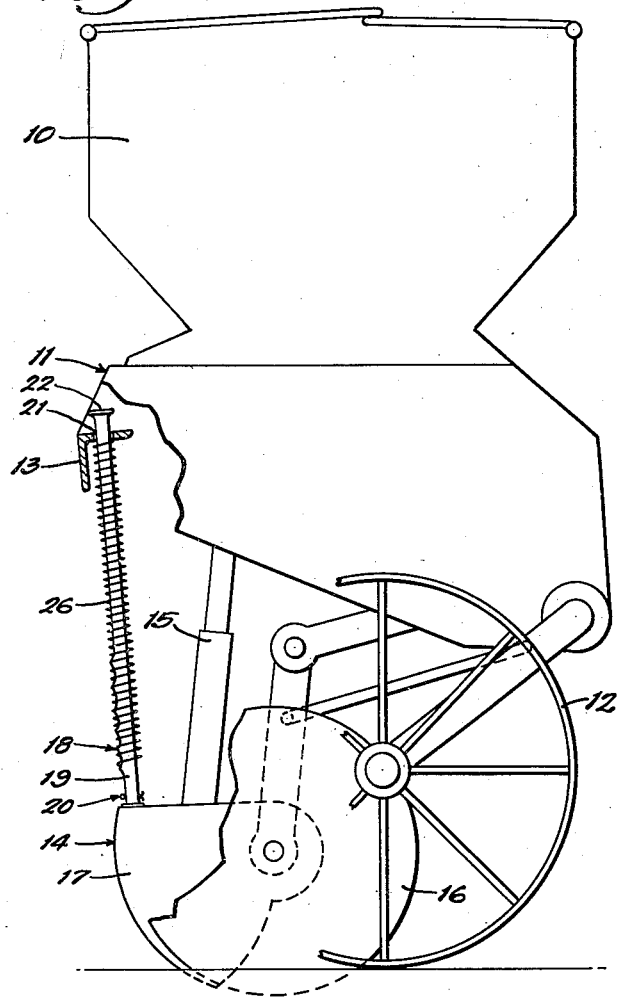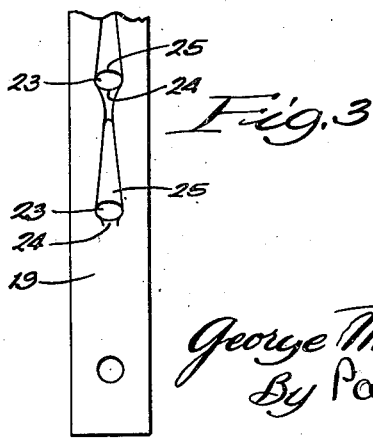

2,443,042

UNITED STATES PATENT OFFICE 2,443,042

AGRICULTURAL IMPLEMENT

George M. Kriegbaum, Richmond, Ind., assignor to International Harvester Company, a corporation of New York Application October 20, 1944, Serial No. 559,491

7 Claims. (Cl. 267—1)

This invention relates to agricultural implements, and particularly to material depositing devices such as grain drills and the like.

An object of the invention is to provide a novel spring means for resiliently holding the material depositing device to its work.

Another object is to provide a novel pressure spring and guide rod assembly which is characterized by simplicity and efficiency.

A further object is to provide a novel pressure spring and rod assembly for agricultural implements which is easily adjustable to vary the pressure applied.

Another object is to provide a pressure spring and rod assembly for agricultural implements wherein the rod is of such configuration as to materially assist the adjustment of the spring.

Other objects and advantages of the invention will become apparent from the following detailed description when read in conjunction with the accompanying drawings wherein:

Figure 1 is a view in side elevation of a grain drill, with parts removed for clarity, embodying the features of the present invention;

Figure 2 is an enlarged detail view, partly in section, of the pressure spring and rod assembly shown in Figure 1; and Figure 3 is a rear elevation of a portion of the rod or tubular member shown in Figures 1 and 2.

Referring to the drawings, the numeral 10 designates a hopper structure containing material such as seed or the like to be dispensed by the mechanism of the present invention. Hopper 10 is mounted upon a supporting structure generally indicated at 11, which is mounted upon ground contacting wheels, only one of which is shown and indicated by the numeral 12. The support likewise includes a transverse angle bar 13, shown in section in Figure 1, and serving a purpose to be hereinafter described.

Attached to the supporting structure 11 is a material dispensing mechanism generally indicated at 14 and including a seed spout 15, a furrow opener 16, a seed boot 17, and a pressure spring and rod assembly 18, the function of which is to adjustably and resiliently hold the ground working elements in operating position.

The pressure spring and rod assembly 18 comprises an elongated tubular member 19, the lower end of which is somewhat loosely secured to the boot 17 by a bolt and cotter arrangement indicated at 20. The upper end of tubular member 19 is passed through an opening 21 in angle bar 13 for sliding movement therein, and is provided at its upper end with an enlargement 22 to prevent dislocation of the member therefrom.

The member 19 may be of any form falling within the scope of the appended claims, but in the embodiment shown in the drawings it is a hollow tube having longitudinally spaced openings 23 in the lower portion thereof, and the lower edge of each of these openings extends outwardly to form a nub or lip 24, indicated in Figure 2, while the portion of the wall of member 19 adjacent the upper edge of each opening 23 is preferably slightly depressed at 25, as clearly shown in Figure 2, the purpose of which will hereinafter become clear. Thus the portion of the wall of member 19 between lip 24 and depressed portion 25 inclines inwardly, the contour of this portion being indicated in Figure 3.

Surrounding tubular member 19 is a pressure spring 26, the upper end of which abuts against angle bar 13 when the material depositing mechanism is in operating position as shown in Figure 1. At its lower end, spring 26 tapers somewhat and the lower end of the spring is bent downwardly and preferably inwardly as shown in Figure 2 to form a prong 27. By virtue of the enlargements or nubs 24 and the angle assumed by prong 27, the prong may be inserted in the opening 23 without deflection thereof.

In order to adjust the tension upon the spring 26, it is grasped by the operator and raised or lowered to a position where the prong is adjacent one of the openings 23. Due to the fact that the smallest diameter of spring 26 is greater than the largest diameter of tubular member 19 as represented by the nubs 24, the spring may easily be moved up and down over the member 19. Upon withdrawal of the prong 27 from one of the openings 23 for placement in another opening to adjust the tension thereon, the spring is grasped by the operator and twisted slightly whereupon the prong 27 engages the wall of the member 19. Upon approaching the selected opening 23, the prong is again twisted until it engages the depression 25 which extends somewhat above the upper edge of the opening 23. Then the wall of the member 19 contiguous to the depression 25 functions as a camming surface which guides and facilitates the entrance of prong 27 into the opening 23. It may be noted that the diameter of the spring is preferably such that it may be transversely flexed to facilitate the manipulation thereof when shifting prong 27 from one opening to another.

From the foregoing description, it should be clear that the pressure spring and rod assembly of the present invention is characterized by simplicity and ease of operation. It should be understood, however, that only a preferred embodiment has been shown and described and that modifications may be made therein without departing from the spirit of the invention or the scope of the appended claims.

What is claimed is:

1. A pressure spring and rod assembly for agricultural implements comprising an elongated spring having one end bent in the direction of extension of the spring to form a prong, an elongated member of lesser diameter than and slidable within said spring, and longitudinally spaced nubs projecting outwardly from said member to a diameter greater than that of the member but less than that of the spring, each said nub having an opening arranged to receive said prong and hold said spring against extension, whereby the tension upon said spring may be adjusted.

2. A pressure spring and rod assembly for agricultural implements comprising an elongated spring tapering at one end and having a portion adjacent that end bent inwardly and in the direction of extension of the spring to form a prong, an elongated member of lesser diameter than and slidable within said spring, longitudinally spaced nubs projecting outwardly from said member to a diameter greater than that of the member but less than the smallest diameter of the spring, each said nub having an opening extending in the direction of and arranged to receive said prong and hold the spring against displacement, whereby the tension upon said spring may be adjusted.

3. A hold-down mechanism for the working element of an agricultural implement comprising, in combination with a support, a generally vertically extending member having longitudinally spaced openings and having its lower end anchored to the working element and its upper end slidable with respect to the support, the portion of the wall of said member adjacent the lower edge of each said opening protruding outwardly of said member to form a lip, a spring surrounding said tubular member and having a diameter greater than the largest diameter thereof, and a prong-like projection at the lower end of said spring adapted to be received without deflection in said opening.

4. A hold-down mechanism for the working element of an agricultural implement comprising, in combination with a support, a generally vertically extending member having longitudinally spaced openings and having its lower end anchored to the working element and its upper end slidable with respect to the support, the portion of the wall of said member adjacent the lower edge of each said opening protruding outwardly of said member to form a lip, a spring surrounding said tubular member decreasing in diameter at its lower portion and having a minor diameter greater than the largest diameter of said member, said spring having its lower end bent downwardly to form a prong adapted to be received in said opening.

5. A pressure mechanism for agricultural implements comprising, a generally vertically extending pressure spring having its lower end bent downwardly and inwardly to form a prong, an elongated member of lesser diameter than and slidable within said spring and having longitudinally spaced openings therein, the portion of the wall of said member adjacent the lower edge of each said opening protruding outwardly of said member to form a lip, and the portion adjacent the upper edge of said opening being depressed inwardly to form with the contiguous wall portions a camming surface for guiding said prong into said opening.

6. A pressure spring and rod assembly comprising a tapered spring having its lower end bent downwardly and inwardly to form a prong, an elongated member of lesser diameter than and slidable within the spring and having longitudinally spaced openings therein, the portion of the wall of said member adjacent the lower edge of each said opening protruding outwardly of said member to form a lip, and the portion adjacent the upper edge of said opening being depressed inwardly to form with the contiguous wall portions a camming surface for guiding said prong into said opening.

7. A pressure spring and rod assembly comprising an elongated spring having its lower end bent downwardly and inwardly to form a prong, an elongated member of lesser diameter than and slidable within the spring, longitudinally spaced nubs projecting from said member, an opening in the upper portion of each said nub extending downwardly and inwardly and adapted to receive said prong, and a depression in the wall of said member adapted to guide said prong into said opening.

GEORGE M. KRIEGBAUM.

REFERENCES CITED

The following references are of record in the file of this patent:

UNITED STATES PATENTS

| Number | Name | Date |
|---|---|---|
| 367,020 | Barlow | July 26, 1887 |
| 377,225 | Barr | Jan. 31, 1888 |
| 513,060 | Schopp et al. | Jan. 16, 1894 |
| 1,242,591 | Raulz | Oct. 9, 1917 |
| 1,340,581 | Van Brunt | May 18, 1920 |
| 2,789,209 | Asbury | Jan. 13, 1931 |